Patented Apr. 16, 1929.

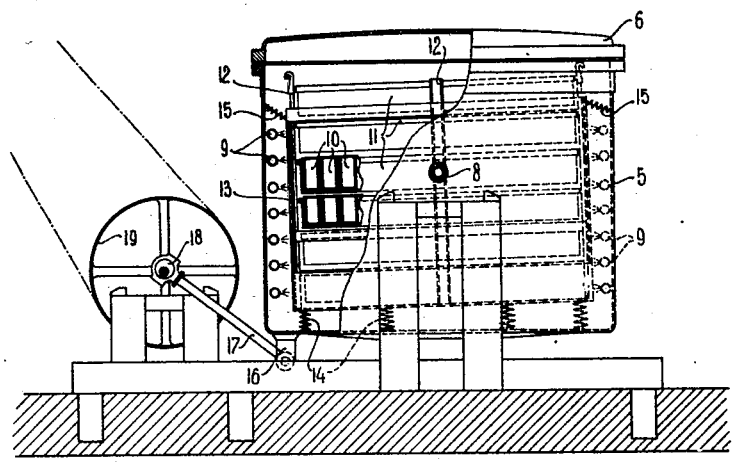
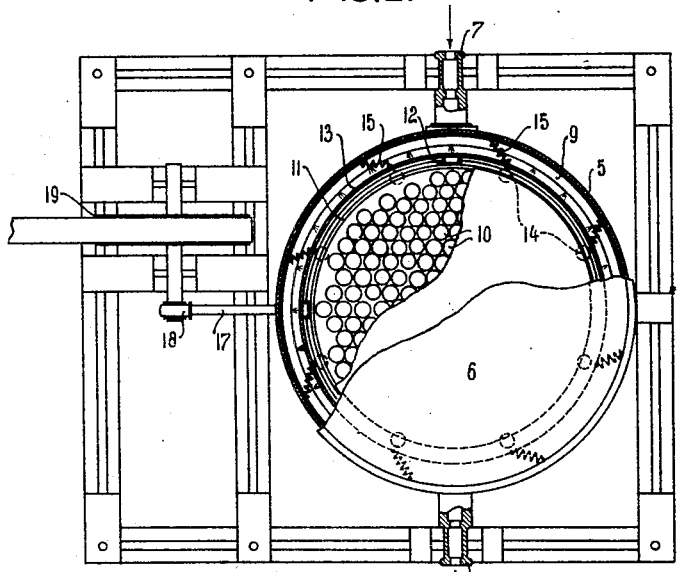

1,709,175

UNITED STATES PATENT OFFICE.

FRÉDÉRIC CONSTANT HUYGEN, OF AMERSFOORT, NETHERLANDS.

PROCESS AND MEANS FOR STERILIZING LIQUID SUBSTANCES.

Application filed September 6, 1927, Serial No. 217,656, and in the Netherlands May 14, 1927.

The object of the present invention is an apparatus, by the use of which liquid substances can be quickly and uniformly sterilized. According to the invention, the liquid substance is, preferably in one and the same apparatus, heated and subsequently cooled, while being subjected to a shaking movement in all directions. Therefore, all the particles of the liquid substance simultaneously perform lateral and vertical reciprocatory, and oscillatory movements so that all particles of the liquid substance to be sterilized have an opportunity to receive heat without being superheated and, during the cooling period, to quickly give up heat. In the sterilization of milk, this prevents the albumen from coagulating.

The more or less diagrammatic drawing shows by way of illustration an apparatus embodying my invention.

Fig. 1 is partly an elevational and partly a sectional view.

Fig. 2 is a top plan view, part of the cover being shown broken away.

The sterilizing tank 5 is fitted with a cover 6, which may be a hinged lid, and is suspended by hollow trunnions 7 and 8 (the bearings of which have not been shown), of which trunnion 7 serves for the admission of cooling water and trunnion 8 for the inlet of steam. The water or steam outlet has not been illustrated. A spray pipe 9 is indicated diagrammatically. It serves to introduce steam and subsequently water into the tank and distribute them over the cans 10 containing the liquid substance. These "cans" are placed in perforated troughs or baskets 11, supported the one above the other within a drum 12, which itself is placed within the sterilizing tank, from which it can be hoisted. Said drum 12 is supported by a carrier 13 permanently associated with the tank. The carrier rests upon freely supported coiled springs 14 and the upper edge of the carrier is engaged by tangential springs 15 secured to the tank.

Secured to the bottom of the tank is a bracket 16 engaged by the eccentric rod 17, the eccentric 18 of which can be rotated by means of a pulley 19. This mechanism therefore imparts to the tank an oscillating motion about the trunnions 7 and 8. The number of revolutions of the eccentric can be adjusted by means of gear not shown.

If the tank is caused to oscillate by means of the eccentric 18, the tension of the springs will of course be changed, the result being that the normal equilibrium between the carrier 13 and the tank 5 is disturbed whereby, after a short time, the carrier receives its own oscillatory movement. Moreover, owing to interference, the carrier also begins to perform a complex shaking movement, so that the liquid in the cans swings, rotates and dashes up and down. Simultaneously, heat is applied by the admission of steam and thereafter withdrawn by the inlet of cooling water.

The springs can, of course be disposed in a manner different from that shown. The tangential springs could engage the carrier at other points, for instance, near the bottom. Under certain circumstances, they could even be dispensed with. Furthermore, buffers may be provided at suitable places to limit the stroke of the carrier relative to the tank and to dampen the impacts. Such buffers could also act tangentially with respect to the carrier, or to the drum. One tangentially acting buffer or abutment could also be used to start and maintain the oscillation. The same effect can be attained by means of a short chain or similar means providing for a certain clearance or freedom of motion.

What I claim is:—

1. In a sterilizing apparatus, the combination with a movable outer tank and means for imparting positive rocking movements thereto, of a carrier disposed in said tank and adapted to receive the liquid to be treated, resilient means for supporting said carrier in said outer tank so as to permit said carrier to freely oscillate and move in all directions upon said tank being rocked, and means for supplying heating and cooling agents.

2. In a sterilizing apparatus, the combination with a movable outer tank and means for imparting positive rocking movements thereto, of a carrier disposed in said tank and adapted to receive the liquid to be treated, springs supporting said carrier from the bottom of said tank and the sides thereof permitting said carrier to freely oscillate and move in all directions upon said tank being rocked, and means for supplying heating and cooling agents.

3. The combination as specified in claim 2, in which the springs supporting the said carrier from the side of said tank are tangentially arranged relative to said carrier so as to permit the same to oscillate about its axis.

4. In a sterilizing apparatus, the combination with a movable outer tank, and means for imparting positive rocking movements thereto, of a carrier disposed in said tank, a drum in said carrier for receiving the liquid to be treated, resilient means for supporting said carrier in said outer tank so as to permit said carrier to freely oscillate and move in all directions upon said tank being rocked, and means for supplying heating and cooling agents.

5. In a sterilizing apparatus, the combination with a movable outer tank, means pivotally suspending the same and an eccentric for continually imparting a rocking movement to said tank, of a carrier disposed in said tank, a drum in said carrier for receiving the liquid to be treated, springs supporting said carrier from the top and sides of said tank permitting said carrier to freely oscillate and move in all directions upon said tank being rocked, and means for supplying heating and cooling agents.

In testimony whereof I affix my signature.

FRÉDÉRIC CONSTANT HUYGEN.